(12) United States Patent
Sun et al.

(10) Patent No.: US 10,690,371 B2
(45) Date of Patent: Jun. 23, 2020

(54) METHOD FOR OUTPUTTING CONSTANT AIR VOLUME BY MULTI-MOTOR DRIVING SYSTEM

(71) Applicant: Zhongshan Broad-Ocean Motor Co., Ltd., Zhongshan (CN)

(72) Inventors: Hairong Sun, Zhongshan (CN); Jipeng Wu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 247 days.

(21) Appl. No.: 16/012,739

(22) Filed: Jun. 19, 2018

(65) Prior Publication Data

US 2018/0313568 A1    Nov. 1, 2018

Related U.S. Application Data

(63) Continuation-in-part of application No. PCT/CN2016/075898, filed on Mar. 8, 2016.

(30) Foreign Application Priority Data

Dec. 31, 2015  (CN) .......................... 2015 1 1034726

(51) Int. Cl.
*F24F 11/74* (2018.01)
*F24F 11/75* (2018.01)
(Continued)

(52) U.S. Cl.
CPC ............... *F24F 11/75* (2018.01); *H02P 5/50* (2013.01); *H02P 5/74* (2013.01); *H02M 7/53871* (2013.01); *H02P 2006/045* (2013.01)

(58) Field of Classification Search
CPC ..... F24F 11/77; F24F 11/74; H02P 2006/045; H02P 5/00; H02P 5/74
See application file for complete search history.

(56) References Cited

U.S. PATENT DOCUMENTS 6,428,282 B1 *  8/2002  Langley ................ F04D 27/004
                                                                417/2
8,233,644 B2 *  7/2012  Demoss ............. H05K 7/20209
                                                              361/688
(Continued)

FOREIGN PATENT DOCUMENTS

CN    102748843 A    10/2012
CN    103809437 A     5/2014
(Continued)

*Primary Examiner* — Thai T Dinh
(74) *Attorney, Agent, or Firm* — Matthias Scholl P.C.; Matthias Scholl

(57) ABSTRACT

A method for outputting constant air volume by a fan system including at least two brushless DC (BLDC) motors, the method including: storing a constant air volume control function Q=F (n, C) in a data processor, where Q indicates an air volume, n indicates a rotational speed of the BLDC motors, and C indicates an operating parameter of the BLDC motors; transmitting, by the data processor, identical speed signal commands to the BLDC motors, and allowing the BLDC motors to operate at equal or approximately equal rotational speeds; and feedbacking, by the BLDC motors, motor operating parameters C to the data processor, calculating, by the data processor, a motor speed n for outputting and maintaining a constant air volume, and transmitting the motor speed to the BLDC motors.

18 Claims, 12 Drawing Sheets

(51) Int. Cl.
  *H02P 5/50* (2016.01)
  *H02P 5/74* (2006.01)
  *H02M 7/5387* (2007.01)
  *H02P 6/04* (2016.01)

(56) References Cited

U.S. PATENT DOCUMENTS

| | | | |
|---|---|---|---|
| 8,773,048 B2* | 7/2014 | Sato | F04D 25/166 318/67 |
| 8,801,390 B2* | 8/2014 | Sato | F04D 25/166 417/44.1 |
| 10,097,119 B2* | 10/2018 | Hause | F04D 27/004 |

FOREIGN PATENT DOCUMENTS

| | | | |
|---|---|---|---|
| CN | 105091230 A | 11/2015 | |
| EP | 0821204 A1 | 1/1998 | |
| EP | 0892330 B1 | 10/2002 | |
| WO | 2009054643 A2 | 4/2009 | |

* cited by examiner

METHOD FOR OUTPUTTING CONSTANT AIR VOLUME BY MULTI-MOTOR DRIVING SYSTEM

CROSS-REFERENCE TO RELATED APPLICATIONS

This application is a continuation-in-part of International Patent Application No. PCT/CN2016/075898 with an international filing date of Mar. 8, 2016, designating the United States, now pending, and further claims foreign priority benefits to Chinese Patent Application No. 201511034726.8 filed Dec. 31, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

This disclosure relates to a method for outputting constant air volume by a multi-motor driving system.

Brushless DC (BLDC) electric motors are synchronous motors powered by DC electricity via an inverter or switching power supply which produces an AC electric current to drive each phase of the motor via a closed loop controller. The advantages of a brushless motor over brushed motors are high power to weight ratio, high speed, and electronic control. Brushless motors find applications in such places as computer peripherals (disk drives, printers), hand-held power tools, and vehicles ranging from model aircraft to automobiles.

SUMMARY

Disclosed is a method for outputting constant air volume by a multi-motor driving system.

Disclosed is a method for outputting constant air volume, the method comprising:
1) providing a fan system comprising at least two brushless DC (BLDC) motors and a plurality of wind wheels, the at least two brushless DC (BLDC) motors being closed-loop speed-control motors and adapting to drive corresponding wind wheels, and disposing the at least two brushless DC (BLDC) motors and the plurality of wind wheels in one air duct;
2) providing a data processor, and storing a constant air volume control function Q=F (n, C) in the data processor, wherein Q indicates an air volume, n indicates a rotational speed of the at least two BLDC motors, and C indicates an operating parameter of the at least two BLDC motors;
3) transmitting, by the data processor, identical speed signal commands to the at least two BLDC motors, and allowing the at least two BLDC motors to operate at equal or approximately equal rotational speeds; and
4) feedbacking, by the at least two BLDC motors, motor operating parameters to the data processor, calculating, by the data processor, a motor speed n for outputting and maintaining a constant air volume, and transmitting, by the data processor, the motor speed to the at least two BLDC motors.

The data processor can be disposed outside the at least two BLDC motors; the at least two BLDC motors each can comprise a control and drive circuit board and a motor body;

The control-and-drive-circuit board can comprise a power circuit, a microprocessor, a detection circuit for detecting the motor operating parameters, an inverter circuit, and a rotor position measurement circuit; the power circuit supplies power to circuits; the rotor position measurement circuit can detect and input a rotor position signal to the microprocessor; the detection circuit can input detected parameters to the microprocessor; the microprocessor can control the inverter circuit to operate; and an output terminal of the inverter circuit can be connected to windings of a stator assembly.

The data processor can be a digital signal processor (DSP) or a microcontroller unit (MCU).

The data processor can communicate with the BLDC motors in a wired or wireless mode.

Two BLDC motors can be employed.

The difference between the rotational speed specified by the data processor and the actual rotational speed of the motors is within plus or minus 3 turns.

The motor operating parameters can be powers or currents.

The constant air volume in the data processor may be an external input value.

The at least two BLDC motors can have the same specifications.

The control-and-drive-circuit board can be integrated with the motor body.

The control-and-drive-circuit board can be separated from the motor body.

The control-and-drive-circuit boards of the at least two BLDC motors can be integrated with the data processor on one circuit board.

The microprocessors of the control-and-drive-circuit boards of the BLDC motors can be replaced by the data processor.

The motor operating parameters fed back to the data processor can be the power, the powers of the BLDC motors can be accumulated by the data processor to yield a total power, and then the total power can be input to the constant air volume control function Q=F (n, P) to calculate the motor speed n for outputting and maintaining the constant air volume.

The motor operating parameters fed back to the data processor can be a bus current, the bus currents of the BLDC motors can be accumulated by the data processor to yield a total bus current, and then the total bus current can be input to the constant air volume control function Q=F (n, P) to calculate the motor speed n for outputting and maintaining the constant air volume.

Advantages of the method in the disclosure are summarized as below
1) The method is easy to implement, can output constant air volume.
2) The BLDC motors can be controlled more conveniently and reliably.
3) The control-and-drive-circuit board can be integrated with the motor body, compacting the motor structure.
4) The control-and-drive-circuit boards of the BLDC motors may be integrated with the data processor on one circuit board, simplifying the circuit design.
5) The data operation of the data processor is efficient.

DETAILED DESCRIPTION

Figure 1:
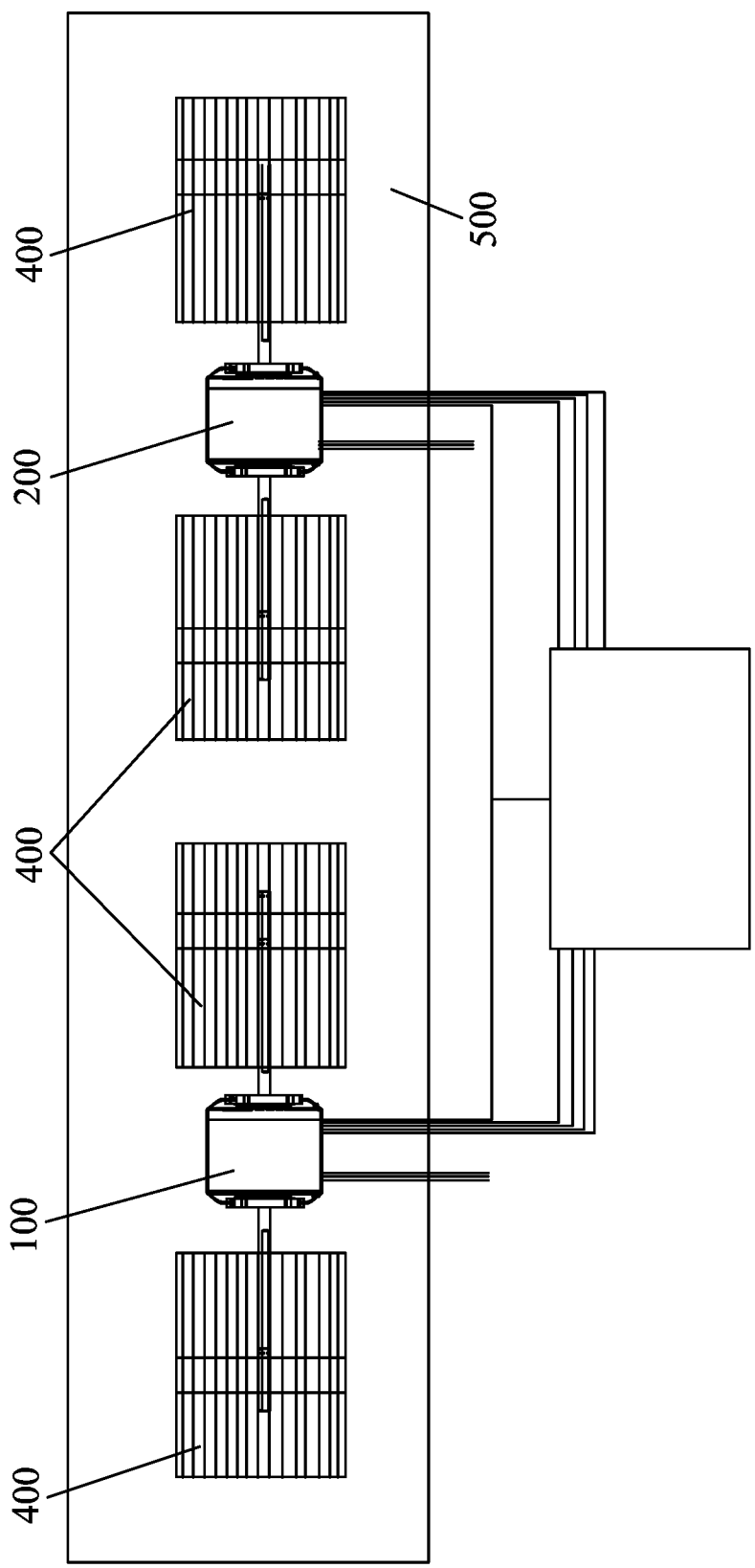
FIG. 1 is a schematic diagram of a first fan system of the disclosure.
Figure 2:
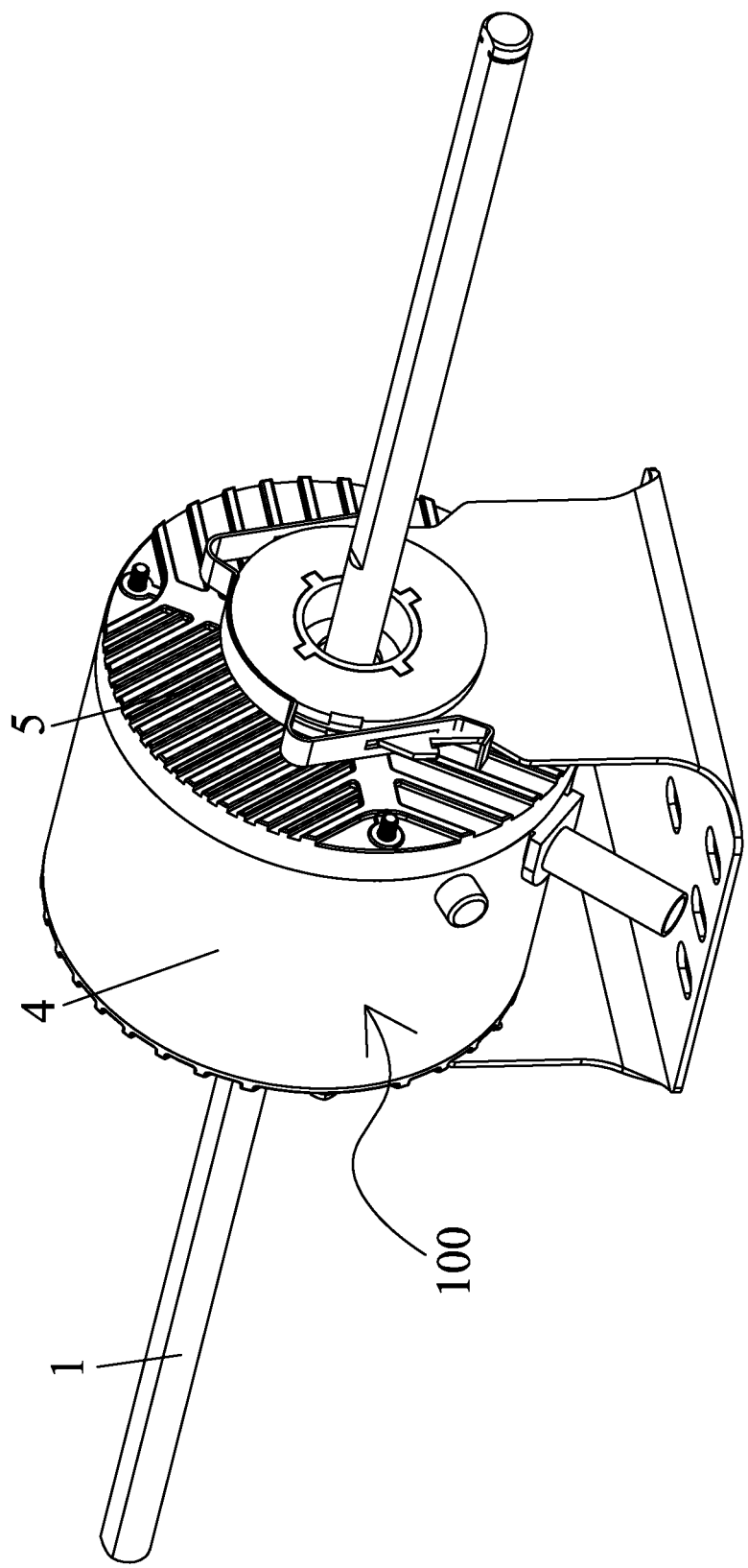
FIG. 2 is a three-dimensional view of a DC brushless motor of the disclosure.
Figure 3:
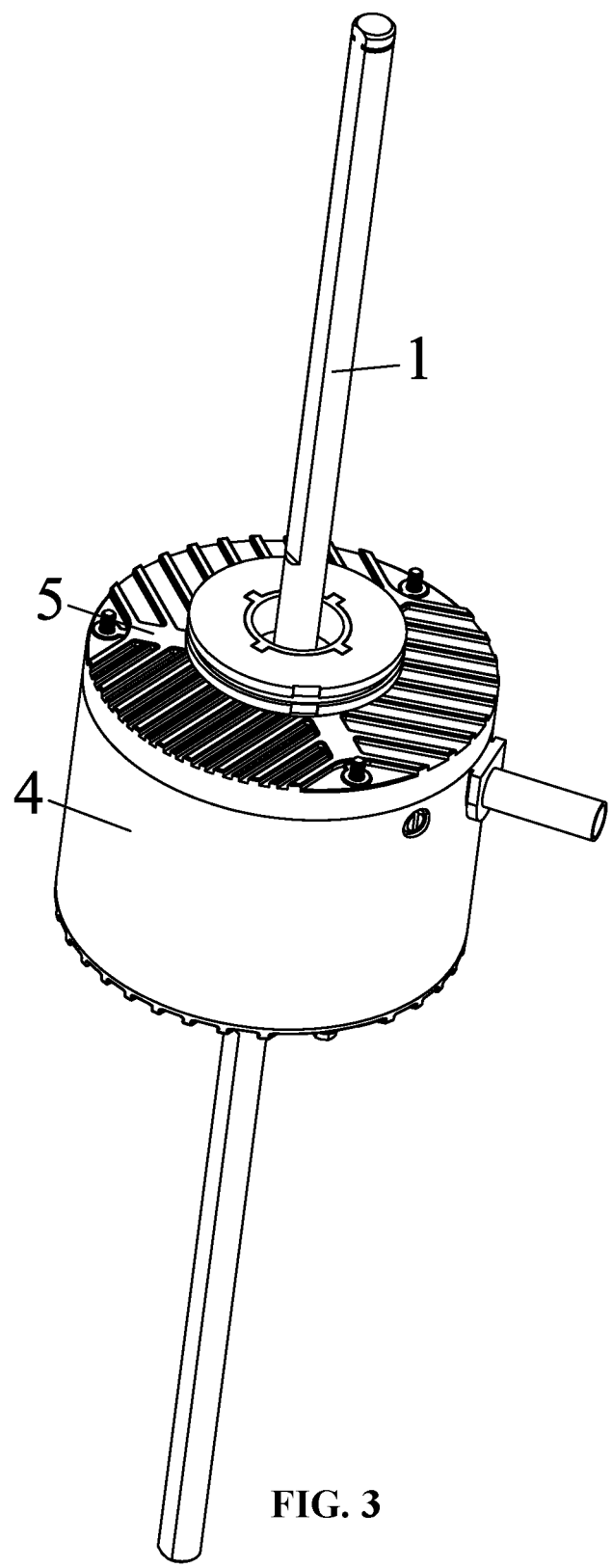
FIG. 3 is an exploded view of the DC brushless motor of the disclosure.
Figure 4:
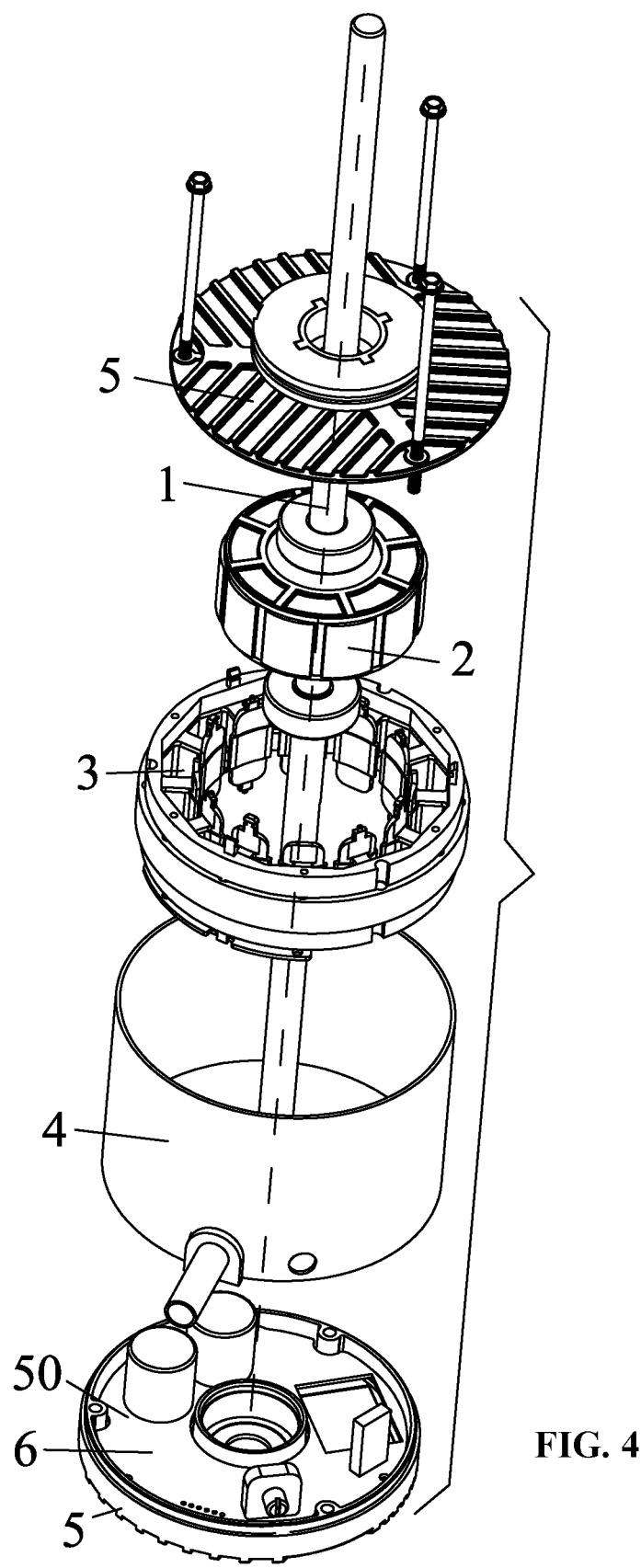
FIG. 4 is another exploded view of the DC brushless motor of the disclosure.
Figure 5:
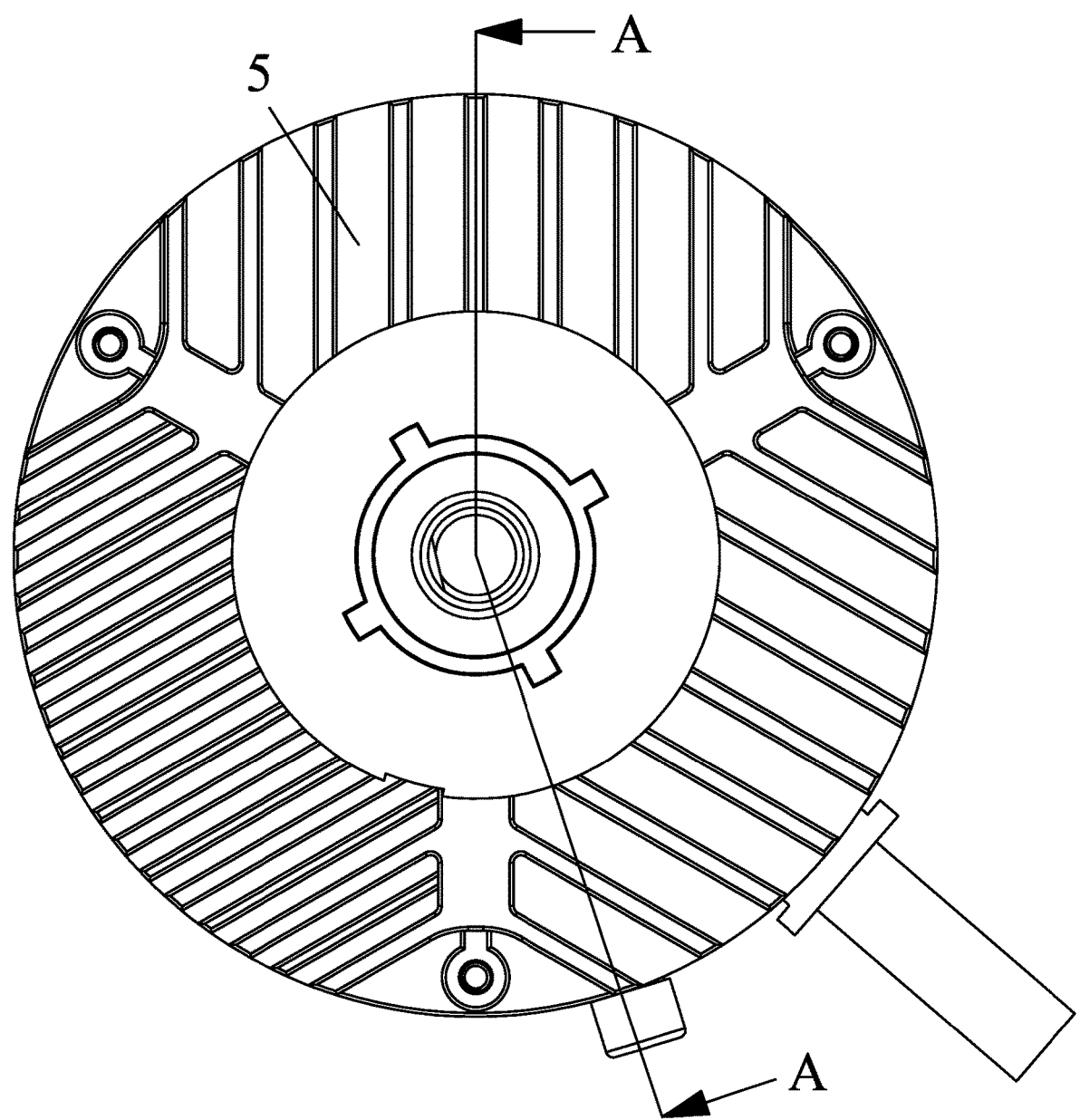
FIG. 5 is a bottom view of the DC brushless motor of the disclosure.
Figure 6:
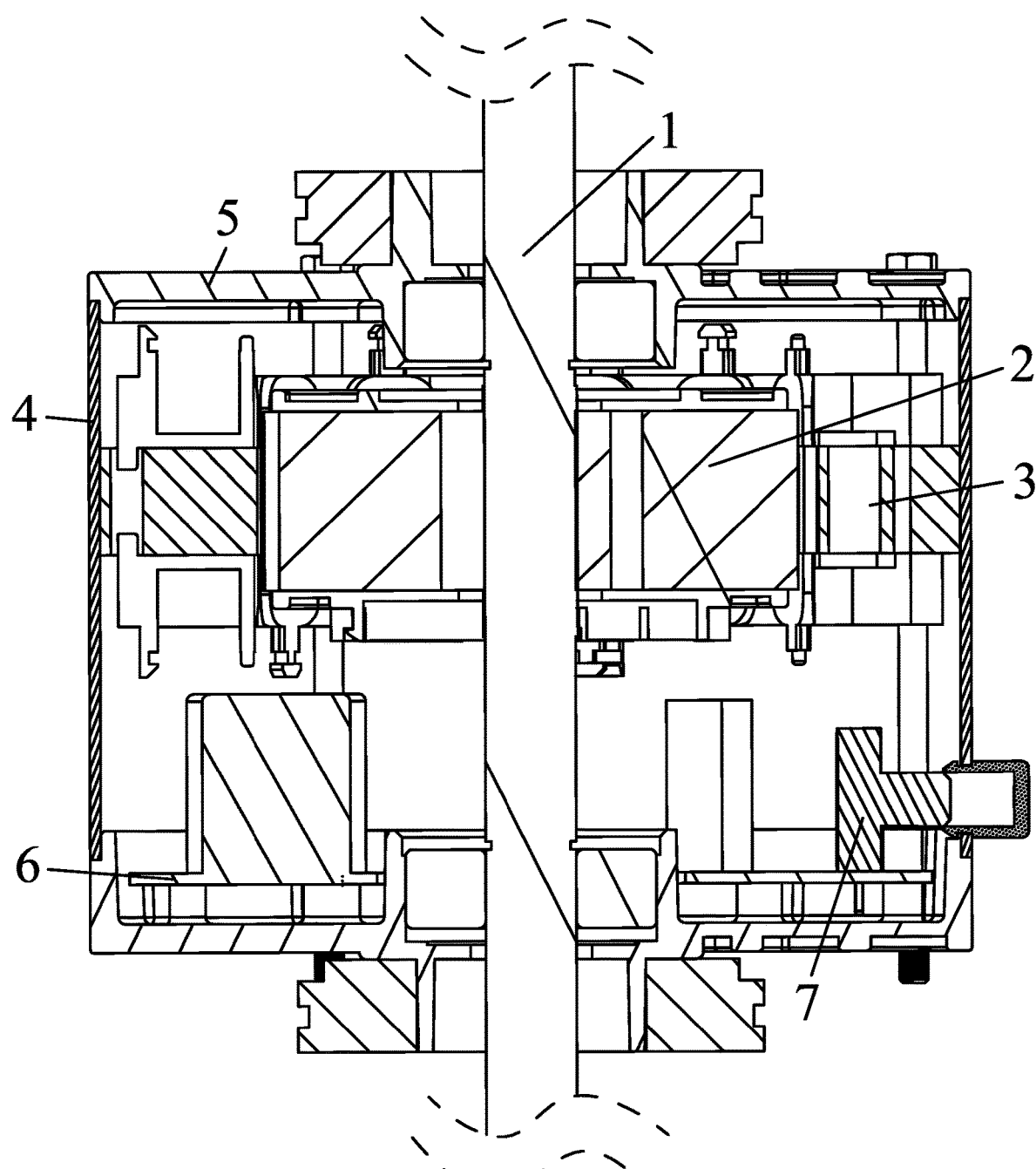
FIG. 6 is a cross-sectional view taken from line VI-VI in FIG. 5.

To further illustrate, experiments detailing a method for outputting constant air volume are described below. It should be noted that the following examples are intended to describe and not to limit the description.

Example 1

As shown in FIGS. 1, 2, 3, 4, 5, and 6, in a fan system with large coil units, two BLDC motors, i.e., a first motor 100 and a second motor 200 drive four wind wheels 400. The output shafts 1 at both ends of the first motor 100 and the second motor 200 drive the wind wheels 400 respectively. The first motor 100 and second motor 200 and the four wind wheels 400 are positioned in the same air duct 500. The first motor 100 and the second motor 200 are BLDC motors of the same specifications. Each of the BLDC motor comprises a motor body and a control and drive circuit board 6. The motor body comprises a rotary shaft 1, a rotor component 2, a stator assembly 3, a housing 4, and an end cover 5. The rotor component 2 is installed to the rotary shaft 1. The stator assembly 3 is installed in the housing 4 and sleeved over the rotor component 2. The end cover 5 is installed to an end portion of the housing 4. Each end of the rotary shaft 1 is supported on a bearing of the end cover 5. The control-and-drive-circuit board 6 is installed in a cavity 10 enclosed by the end covers 5 and the housing 4. A speed-regulating potentiometer 7 is installed on the control-and-drive-circuit board 6 through welding. In this example, a chamber 50 is formed in an inner side of the front end cover or the rear end cover, and the control-and-drive-circuit board 6 is installed in the chamber 50.

Figure 7:
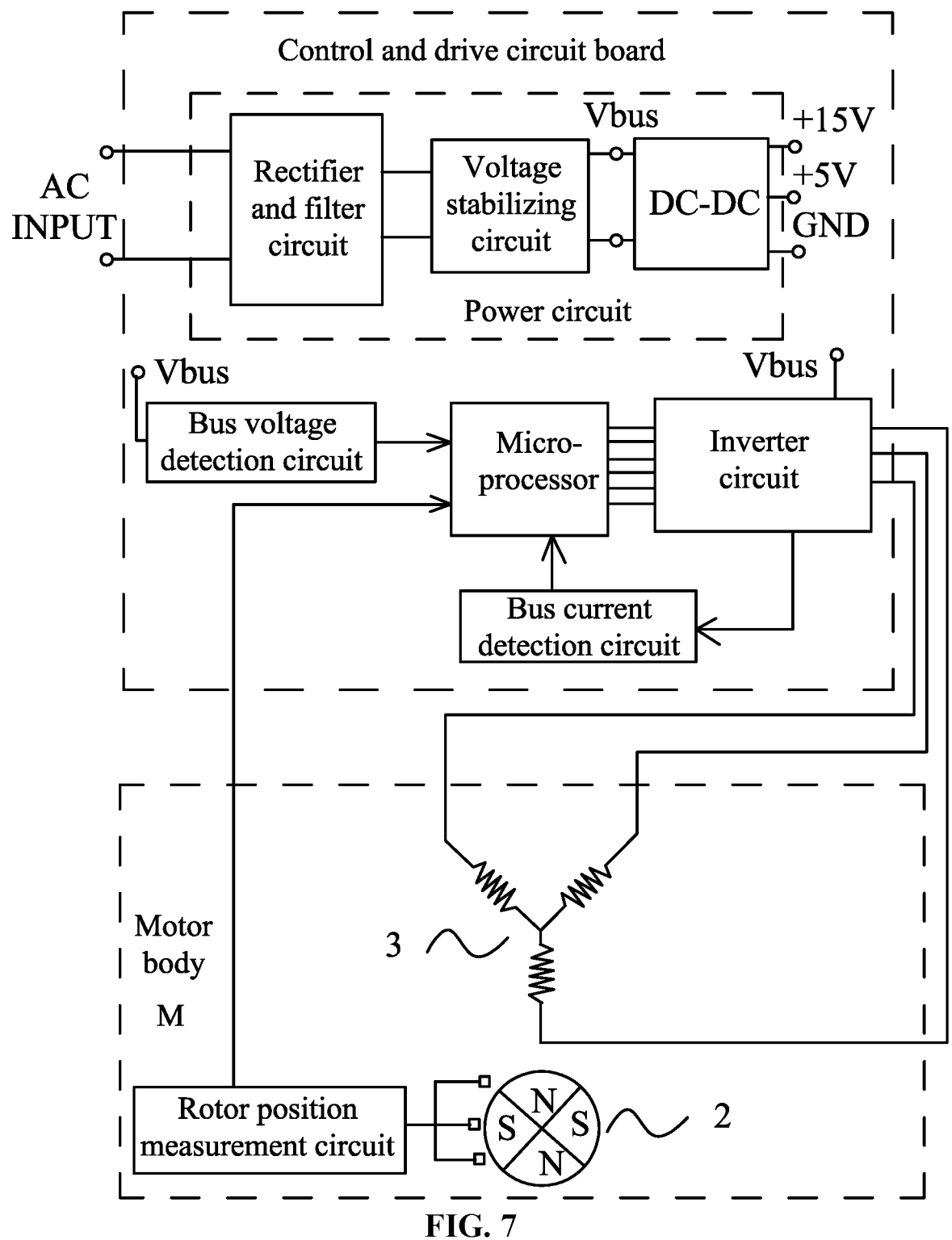
FIG. 7 is a block diagram of a control and drive circuit board of the disclosure.
Figure 8:
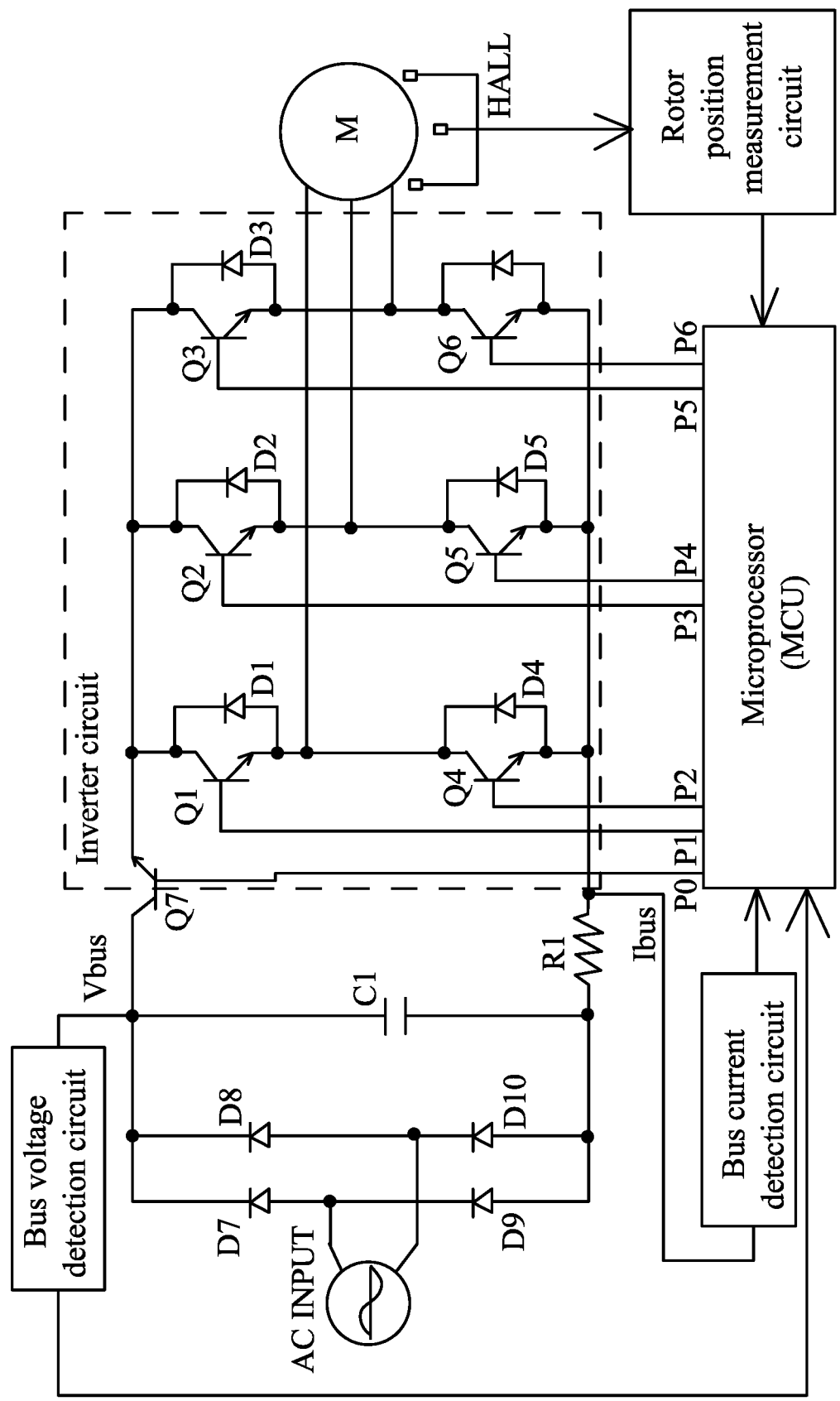
FIG. 8 is a circuit diagram of the control-and-drive-circuit board in FIG. 7.

A data processor is positioned outside the BLDC motors. Each BLDC motor comprises a control and drive circuit board and a motor body. The control-and-drive-circuit board comprises a power circuit, a microprocessor, a detection circuit for detecting motor operating parameters, an inverter circuit, and a rotor position measurement circuit. The power circuit supplies power to circuits. The rotor position measurement circuit detects a rotor position signal and inputs it to the microprocessor. The detection circuit for detecting motor operating parameters inputs detected parameters to the microprocessor. The microprocessor controls the inverter circuit to operate. An output end of the inverter circuit is connected to windings of various phases of the stator assembly. As shown in FIGS. 7 and 8, assume that the BLDC motors are 3-phase brushless DC permanent magnet synchronous motors, and the detection circuit for detecting motor operating parameters comprises a rotor position measurement circuit, a bus current detection circuit, and a bus voltage detection circuit. The rotor position measurement circuit typically consists of three hall sensors. The three hall sensors detect a rotor position having a 360 electrical degree period. Each time the rotor rotates by a 120 electrical degree, the power to windings of various phase of the stator assembly 12 is switched on/off once, resulting in a 3-phase and 6-step control mode. An AC INPUT passes through a full wave rectifier circuit consisting of transistors D7, D8, D9, and D10, and then a DC bus voltage Vbus is output at an end of a capacitor $C_1$. The DC bus voltage Vbus is dependent on the input AC voltage. After determination of the voltage of the AC INPUT, the line voltage UP of the 3-phase windings, which is a PWM chopped output voltage, can be determined as UP=Vbus*α, where α is a duty cycle of the PWM signal input to the inverter circuit by the microprocessor. Change in the line voltage UP can cause change in the DC bus current Ibus. The inverter circuit consists of electronic switch tubes Q1, Q2, Q3, Q4, Q5, and Q6. The control ends of the electronic switch tubes Q1, Q2, Q3, Q4, Q5, and Q6 are controlled respectively by 6 PWM signals (P1, P2, P3, P4, P5, and P6) output by the microprocessor. The inverter circuit is also connected to a resistor R1 for detecting the bus current Ibus. The bus current detection circuit converts the bus current Ibus detected by the resistor R1 and sends it to the microprocessor. The input power of the motor is controlled by the electronic switch tube Q7. The first PWM signal, i.e. P0, output by the microprocessor controls the on-time of the electronic switch tube Q7 so as to control the input power of the motor. The rotor position measurement circuit detects the rotor position signal and inputs it to the microprocessor. The microprocessor calculates the real-time rotational speed V of the motor based on the rotor position signal. The bus current detection circuit inputs the bus current to the microprocessor. The bus voltage detection circuit inputs the DC bus voltage to the microprocessor. The microprocessor calculates the input power P=Ibus*Vbus.

At this point, a method for outputting constant air volume provided by a fan system driven by 2BLDC motors is provided, and the method is detailed as follows: 1) each BLDC motor is configured as a closed-loop speed-control motor; 2) a constant air volume control function Q=F (n, P) is stored in a data processor, where Q is air volume, n is a rotational speed of the motor, and P is input power of the motor; 3) the data processor sends identical or equivalent speed signal commands to the BLDC motors (the word "equivalent" means that the difference between the commanded motor speeds sent to the two BLDC motors is within 1%), so that the BLDC motors operate at equal or approximately equal rotational speeds (the word "equivalent" means that the difference between the actual speeds of the two BLDC motors is within 1%; 4) the BLDC motors feedback their input powers P1 and P2 to the data processor which calculates a motor speed n for maintaining the constant air volume based on the total input power of the motors P=P1+P2 fed back by the BLDC motors and then sends identical speed signal commands to the BLDC motors.

In order to build the mathematical model: constant air volume control function Q=F (n, C), assume that the motor operating parameter C fed back to the data processor by the BLDC motors is a power parameter P, then a constant air volume control function may be built for a plurality of air volume points over the range of air volumes. At a certain air volume point, the functional relation formula P=f (n) is a polynomial function $P=C_1+C_2 \times n+ \ldots +C_m \times m^{m-1}$, where $C_1, C_2, \ldots, C_m$ are coefficients, P is the input power, and n is the rotational speed of the motor. Each target air volume is stored in association with a set of coefficients $C_1, C_2, \ldots C_m$. The microprocessor obtains a corresponding set of coefficients $C_1, C_2, \ldots C_m$ based on the input target air volume IN-CFM through table look-up or interpolation, and consequently obtains the functional relation formula P=f(n).

The functional relation formula P=f (n) is a second order function: $P=C_1+C_2 \times n+C_3 \times n^2$.

Figure 9:
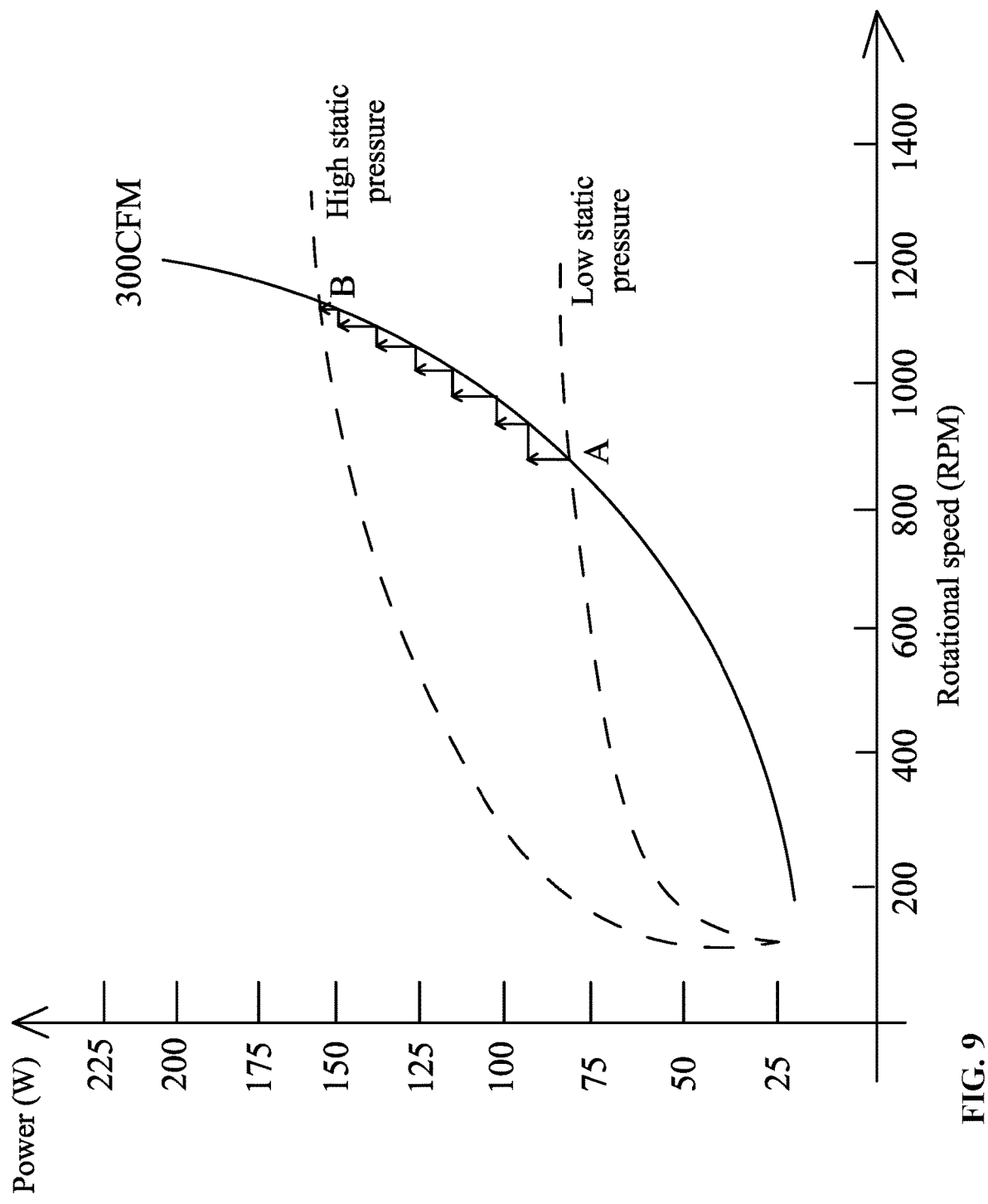
FIG. 9 shows one fitting curve for outputting constant air volume of the disclosure.
Figure 10:
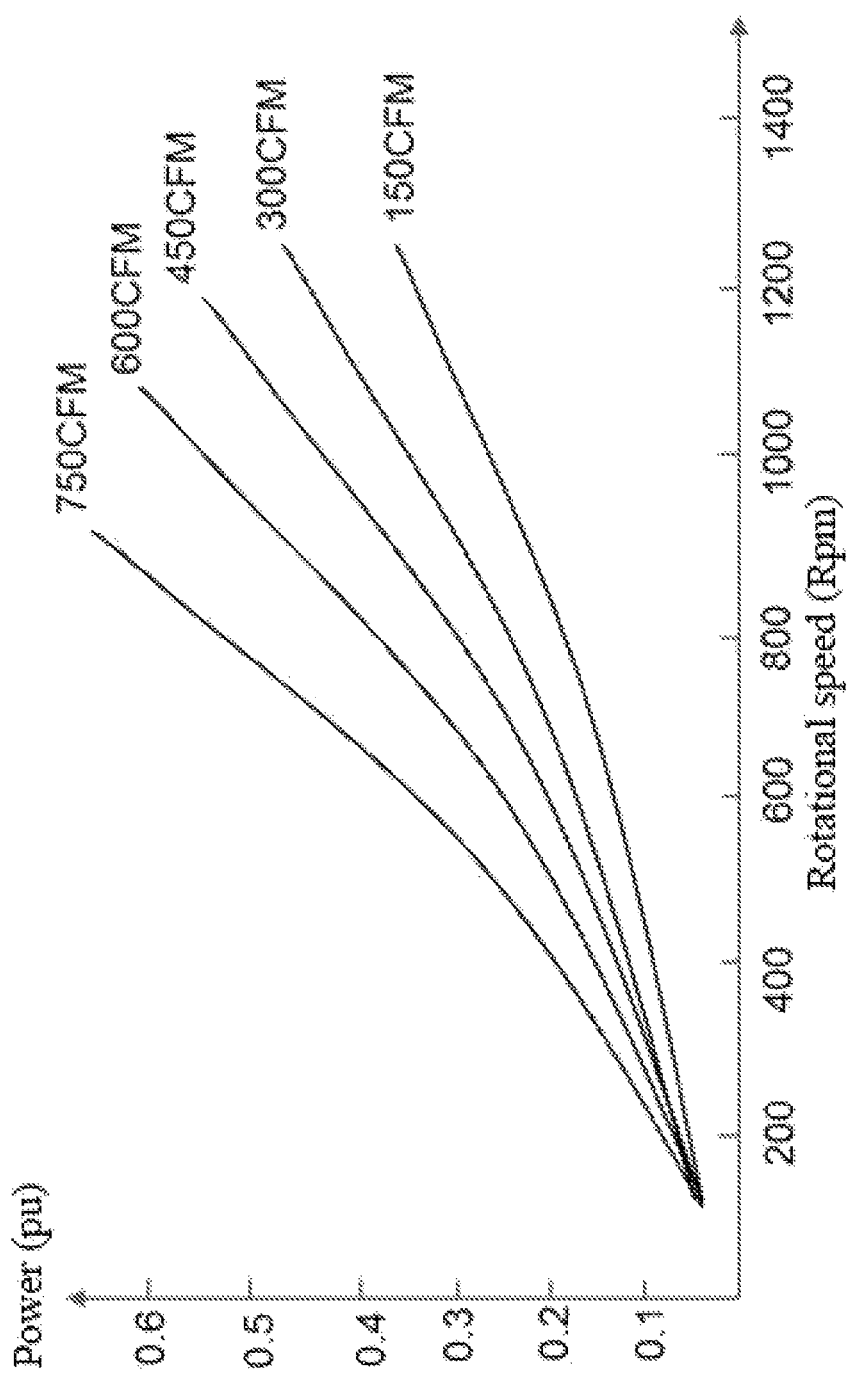
FIG. 10 shows five fitting curves for outputting constant air volumes of the disclosure.

In the method for direct power control of constant air volume according to the disclosure, the mathematical model is developed and built as follows. Generally, in a ventilation system, the fan is driven by a BLDC motor to produce air flow in a stable state. Constant air volume control is achieved through speed and power control under a static pressure by using the following relation formula: CFM=F (P, speed, pressure), where CFM is the air volume, P is the power of the motor, speed is the speed of the motor, and pressure is the static pressure. In the case of a plurality of wind wheels driven by two BLDC motors, assume that the BLDC motors operate at synchronized rotational speeds. Of the powers P=P1±P2 in the function, power P1 is the power of the first motor, and power P2 is the power of the second motor. When the static pressure changes, the constant air volume may be maintained through power and speed control. As the static pressure increases, the power and speed increase accordingly. A constant air volume (CFM) curve indicates that, as shown in FIG. 9, CFM=300. Based on these constant air volume (CFM) curves, a control model is developed, so that given an air volume requirement specified by product control, constant air volume CFM can be provided through power and speed control under a certain static pressure. In FIG. 10, a characteristic curve represents the physical characteristic of the constant air volume achieved by maintaining the control of power and speed. Within the rated power range of any motor and for an airflow system of any type of design from any air-conditioner manufacture, a conclusion can be drawn based on the power testing results and the speed curve that a typical second order function serves well to be developed and modeled as a typical function, $P=C_1+C_2 \times n+C_3 \times n^2$. By selecting three unknown points (A, B, and C) on the curve that have data (p1, n1), (p2, n2), and (p3, n3) at their corresponding coordinates and acquiring coefficients $C_1, C_2$, and $C_3$ accordingly, the following formula is obtained: $F(A, B, C)=\Sigma_i^m(Yi-(C1+C2*n+C3*n^2))^2$, and by assuming $\partial F/\partial A=0$, $\partial F/\partial B=0$, and $\partial F/\partial C=0$, m=3 is obtained through equation solution.

In the process of curving fitting, a polynomial is used for describing the curve. The coefficients in the polynomial can be obtained through a least square approach. Theoretically, $P=C_1+C_2 \times n+C_3 \times n^2+ \ldots +Cm \times n^{m-1}$ can be used. Practically, a binomial is sufficient for general cases. The functional relation formula P=f(n) is a second order function: $P=+C_2 \times n+C_3 \times n^2$ where $C_1, C_2$, and $C_3$ are coefficients, and n is the rotational speed of the motor. Any target air volume of the plurality of target air volumes under test is stored in association with a set of coefficients $C_1, C_2$, and $C_3$. The microprocessor acquires a corresponding set of coefficients $C_1, C_2$, and $C_3$ based on the input target air volume IN-CFM through table lookup and thus obtains a functional relation formula P=f(n). In a certain load, each target air volume corresponds to a set of coefficients $C_1, C_2$, and $C_3$, as shown specifically by Table 1 below.

TABLE 1

| CMF | $C_1$ | $C_2$ | $C_3$ |
|---|---|---|---|
| 150 | 0.338 | −0.151 | 0.0458 |
| 300 | 0.4423 | −0.2113 | 0.0765 |
| 450 | ... | ... | ... |
| 600 | ... | ... | ... |
| 750 | ... | ... | ... |
| 900 | ... | ... | ... |

FIG. 10 shows a fitting curve of the experimental data for a ⅓HP PM motor in direct power control of constant air volume in an HVAC system with a small duct. Given a target airflow, the system selects some typical air volumes (CFMs) as testing points to build a database for mathematical model building. These typical points comprise a minimum air volume value, a maximum air volume value, and some additional median values. Depending on the product specification, five typical air volumes CFM: 150, 300, 450, 600, and 750 CFM are selected as testing points.

Figure 11:
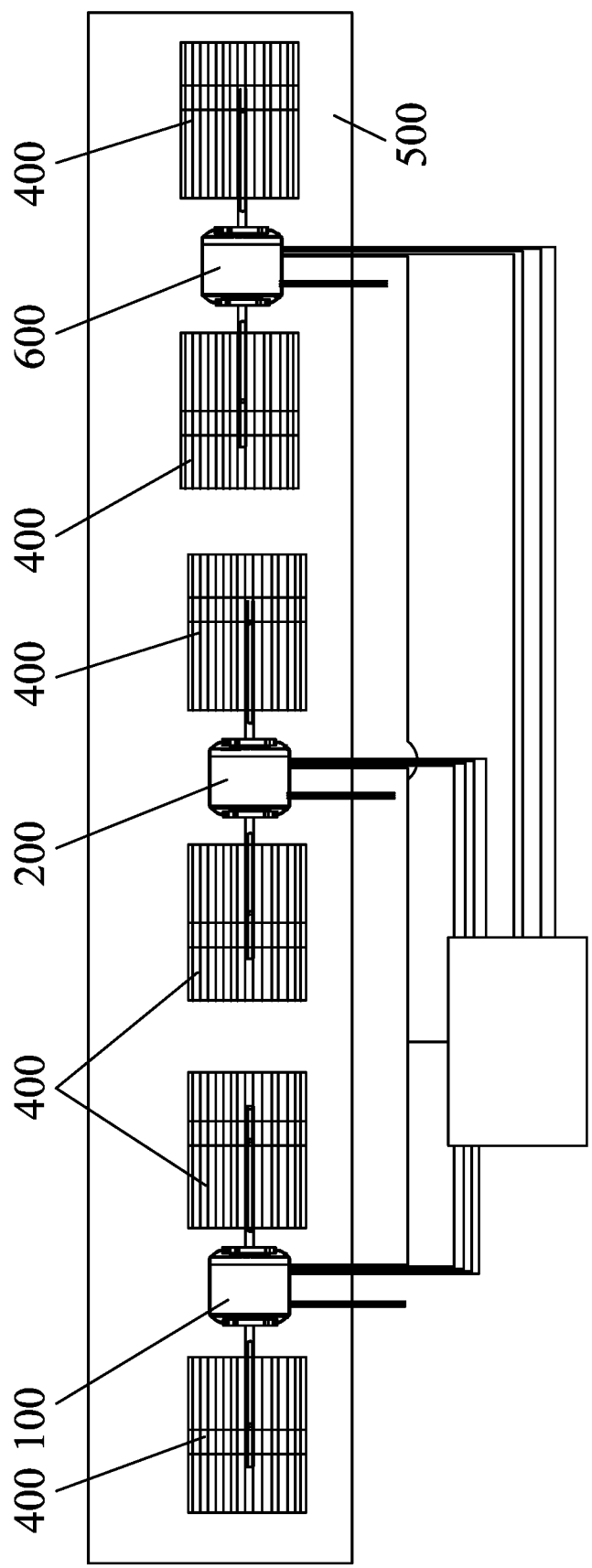
FIG. 11 is a schematic diagram of a second fan system of the disclosure.

Table 2 shows an example of the testing results. The rotational speed of the motor ranges from 200 to 1400 rpm. The static pressure in the system is from 0.1 to 1 $H_2O$. By maintaining a preset constant air volume CCFM output, an input power per-unit value for the motor from FIG. 11 is obtained so as to create a data base.

TABLE 2

| 150 CFM | | 300 CFM | | 450 CFM | | 600 CFM | | 750 CFM | |
|---|---|---|---|---|---|---|---|---|---|
| rpm | Power | rpm | Power | rpm | Power | rpm | Power | rpm | Power |
| 385.3 | 3.6% | 452.2 | 6.9% | 590.1 | 14.8% | 693.6 | 26.6% | 822.9 | 45.6% |
| 385.9 | 3.6% | 577.7 | 10.6% | 680.6 | 19.6% | 763.9 | 31.6% | 878.1 | 50.4% |
| 531 | 6.0% | 700.3 | 14.6% | 778.5 | 24.7% | 839.3 | 37.2% | 936 | 56.4% |
| 637.3 | 8.6% | 787.5 | 18.4% | 858.4 | 29.8% | 905 | 43.2% | 997.9 | 63.9% |
| 737.4 | 11.6% | 861.2 | 22.2% | 940.5 | 35.2% | 987.8 | 50.6% | 1056 | 70.5% |
| 818.4 | 14.4% | 932.6 | 26.2% | 1015 | 41.0% | 1051 | 57.0% | 1115 | 77.1% |
| 891 | 17.4% | 997.9 | 30.5% | 1078 | 45.6% | 1127 | 64.1% | 1176 | 83.3% |
| 970.3 | 21.5% | 1053 | 34.2% | 1146 | 51.6% | 1184 | 70.2% | 1173 | 83.2% |
| 1029 | 24.8% | 1119 | 39.7% | 1197 | 56.6% | 1245 | 75.0% | | |
| 1100 | 28.3% | 1165 | 43.1% | 1252 | 61.6% | | | | |
| 1163 | 32.4% | | | | | | | | |

Using a least square approach, each predetermined CFM air volume corresponds to a second order function of the power and rotational speed. A standard calculation process is used to obtain the power defined by these equations and the speed at an operating point for any system under a certain static pressure. When a preset air volume IN-CFM is input, the motor system defines a corresponding function, in which the track of its operating points is defined by this function. Equations (3) to (7) represent a standard equation, $C_1$, $C_2$, and $C_3$ being constants.

$$P(150) = 0.3388\left(\frac{n}{1000}\right)^2 - 0.1551\left(\frac{n}{1000}\right) + 0.0458 \quad (3)$$

$$P(300) = 0.4423\left(\frac{n}{1000}\right)^2 - 0.2113\left(\frac{n}{1000}\right) + 0.0765 \quad (4)$$

$$P(450) = 0.3987\left(\frac{n}{1000}\right)^2 - 0.0308\left(\frac{n}{1000}\right) + 0.0294 \quad (5)$$

$$P(600) = 0.2580\left(\frac{n}{1000}\right)^2 + 0.3983\left(\frac{n}{1000}\right) - 0.1379 \quad (6)$$

$$P(750) = 0.1385\left(\frac{n}{1000}\right)^2 + 0.8150\left(\frac{n}{1000}\right) - 0.3139 \quad (7)$$

If the requested air volume IN-CFM is not one of the modeled curves, an interpolation process is used for obtaining a characteristic equation to fit the requested constant air volume IN-CFM. For example, when the request for constant air volume IN-CFM=525 cfm is received, the modeling of two adjacent curves CFM1-600 cfm and CFM2-450 cfm can be identified. Then two corresponding equations can be used to calculate a new equation for the curve IN-CFM=525 cfm through interpolation.

When there is only one preset air volume value in the fan system described above, no external input is required. However, when there is a plurality of preset air volume values or a randomly preset air volume value, the constant air volume Q in the data processor can be determined based on an external input, and constant air volume control functions for a plurality of air volume points under test are stored in the data processor. If the constant air volume IN-CFM requested by the input is not one of the modeled curves (the constant air volume control functions for the plurality of air volume points under test), then an interpolation process is used for obtaining a new characteristic equation to fit the requested constant air volume IN-CFM.

The data processor is in wired or wireless communication with the BLDC motors. The data processor may be a digital signal processor (DSP) or a microcontroller unit (MCU). The data processor communicates with a microprocessor in the control-and-drive-circuit board 6 of each of the two BLDC motors.

The two BLDC motors are high-accuracy controlled motors. The expression "high accuracy" means that the difference between the rotational speed specified by the data processor and the actual rotational speed of the motors is in a range of plus or minus 3 turns. The two BLDC motors have the same specification. The control-and-drive-circuit board and the motor body may be manufactured integrally.

Alternatively, the control-and-drive-circuit board and the motor body may be manufactured separately. The control-and-drive-circuit board for the BLDC motors may be integrated with the data processor on the same circuit board.

Example 2

This example provides the same structure and control method as those of the first example, except that, in this example, six wind wheels 400 are driven by three BLDC motors, i.e., a first motor 100, a second motor 200, and a third motor 600. The output shafts 1 at both ends of the first motor 100, second motor 200, and third motor 600 drive respectively the wind wheels 400. The first motor 100, second motor 200, and third motor 600, and the six wind wheels 400 are positioned in the same air duct 500. The first motor 100, second motor 200, and third motor 600 are BLDC motors of the same specification.

A constant air volume control function Q=F (n, P) is stored in the data processor, where Q is the air volume, n is the rotational speed of the motor, and P is the input power of the motor. The data processor sends identical speed signal commands to the three BLDC motors, so that the BLDC motors operate at equal or approximately equal rotational speeds. The word "equivalent" means that the difference between the actual speeds of each two BLDC motors is within 1%. The three BLDC motors feedback input power parameters of the motors P1, P2, and P3 to the data processor respectively. That is, the first motor 100 feeds back the input power of the motor P1 to the data processor, the second motor 200 feeds back the input power of the motor P2 to the data processor, and the third motor 600 feeds back the input power of the motor P3 to the data processor. The data processor calculates a motor speed n for maintaining the constant air volume based on the total input power of the motors P=P1+P2+P3 fed back by the BLDC motors and then sends identical speed signal commands to the BLDC motors.

A plurality of constant air volume control functions Q=F (n, P) is stored in the data processor for different air volume points. For example, the function for air volume of 300 CFM is:

$$P(300) = 0.4423\left(\frac{n}{1000}\right)^2 - 0.2113\left(\frac{n}{1000}\right) + 0.0765$$

The function for air volume of 450 CFM is:

$$P(450) = 0.3987\left(\frac{n}{1000}\right)^2 - 0.0308\left(\frac{n}{1000}\right) + 0.0294$$

The function for air volume of 600 CFM is:

$$P(600) = 0.2580\left(\frac{n}{1000}\right)^2 + 0.3983\left(\frac{n}{1000}\right) - 0.1379.$$

If the user requires air volume of 300 CFM to be output, then a corresponding constant air volume control function is called. Based on the fed back total input power of the motors P, a motor speed n for maintaining the constant air volume is calculated, and identical speed signal commands are sent to the BLDC motors.

Although three BLDC motors are used in this example, in practice, more BLDC motors and wind wheels may be added depending on the width of the air duct in the fan system. For example, four BLDC motors and eight wind wheels may be used instead.

Example 3

This example is a modification of the first example.

A method for outputting constant air volume provided by a fan system driven by two BLDC motors is summarized as follows: 1) each BLDC motor is configured as a closed-loop speed-control motor; 2) a constant air volume control function Q=F (n, I) is stored in a data processor, where Q is the air volume, n is the rotational speed of the motor, and I is the DC bus current; 3) the data processor sends identical or equivalent speed signal commands to the BLDC motors (the word "equivalent" means that the difference between the commanded motor speeds sent to the two BLDC motors is within 1%), so that the BLDC motors operate at equal or approximately equal rotational speeds (the word "equivalent" means that the difference between the actual speeds of the two BLDC motors is within 1%; and 4) the BLDC motors feedback DC bus current parameters I1 and I2 to the data processor which calculates the motor speed n for maintaining the constant air volume based on the DC bus current I=I1+I2 fed back by the BLDC motors and then sends identical speed signal commands to the BLDC motors.

Assume that the functional relation formula of constant air volume I=f(n) at a certain air volume point for a selected BLDC motor model is a second order function: $I=C_1+C_2\times n+C_3\times n^2$. Through experimentation, a plurality of data sets, such as (I, n), is measured while maintaining a certain air volume point constant. Then through curve fitting, coefficients $C_1$, $C_2$, and $C_3$ for a certain air volume point are obtained. Similarly, coefficients $C_1$, $C_2$, and $C_3$ of the constant air volume functions can be obtained for a plurality of air volume points, as shown in Table 3:

TABLE 3

| Constant air volume | $C_1$ | $C_2$ | $C_3$ |
|---|---|---|---|
| 150 | 0.58 | −0.23 | 0.0224 |
| 300 | 0.66 | −0.33 | 0.0985 |
| 450 | ... | ... | ... |
| 600 | ... | ... | ... |
| 750 | ... | ... | ... |
| 900 | ... | ... | ... |

Then constant air volume functions for a plurality of air volume points are stored in the data processor. In this way, control of the constant air volume provided by a fan system driven by two BLDC motors can be realized, as long as each BLDC motor operates at a specified rotational speed according to the speed signal command sent by the data processor.

Example 4

Figure 12:
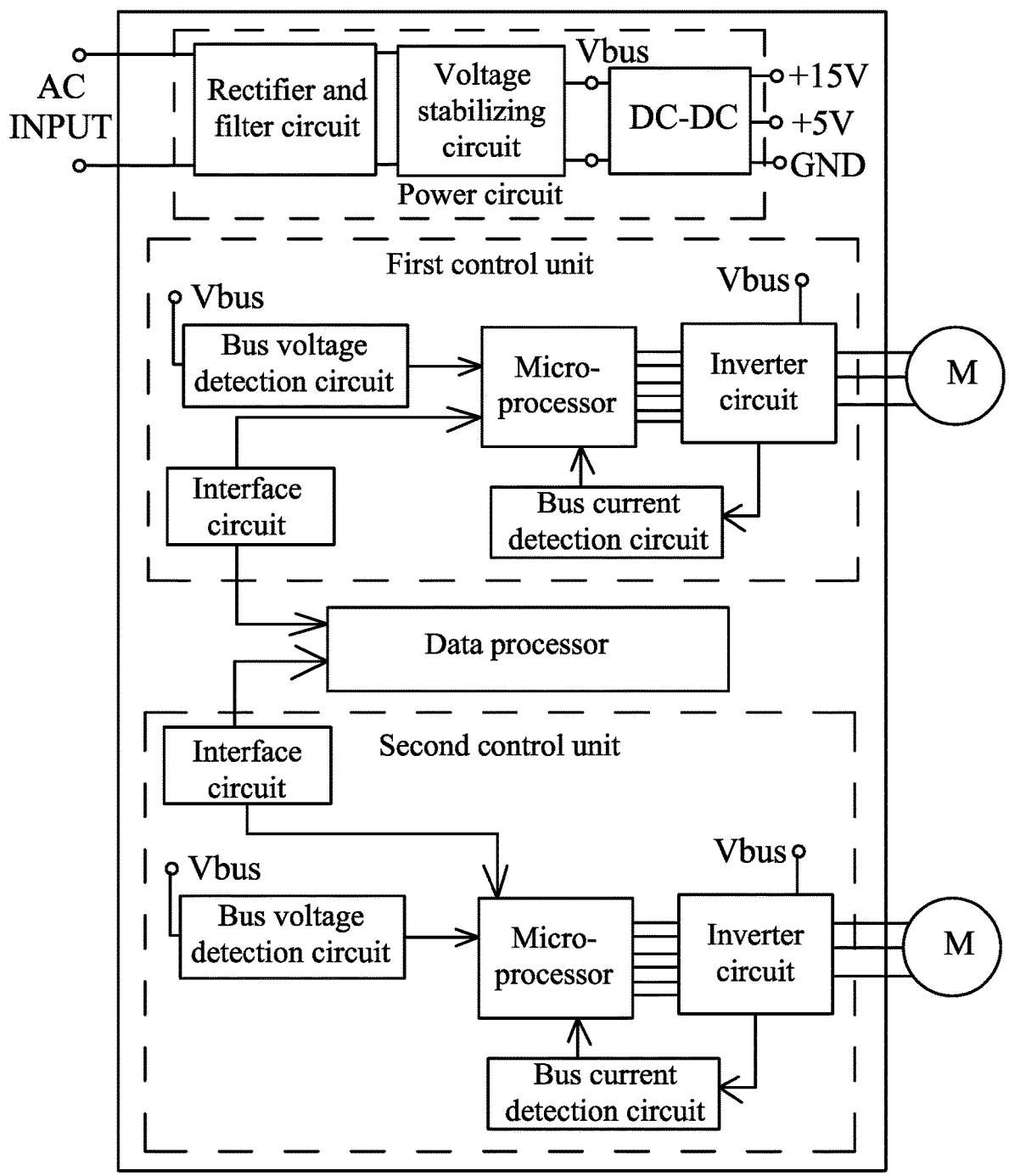
FIG. 12 is a schematic diagram of a third fan system of the disclosure.

This example is a modification of the first example. The control-and-drive-circuit boards 6 of the two BLDC motors in the first example are arranged outside the motor housing 4. This is because the control-and-drive-circuit board 6 of the two BLDC motors and the data processor require separate power supplies, and such a duplicated circuit configuration leads to increased costs. Now The control-and-drive-circuit boards 6 of the two BLDC motors and the data processor are integrated on the same circuit board and share a common power circuit for power supply, eliminating the duplicated circuit layout, thereby resulting in a simplified structure and lower costs. As shown in FIG. 12, the original control and drive circuit boards 6 for the two BLDC motors now become a first control unit and a second control unit respectively. The power circuit supplies power to both the first and second control units and the data processor, thereby saving the costs.

If a high-performance chip with high computation speed and many I/O ports is used for the data processor, then the microprocessors in the first control unit and second control unit may be omitted, with the data processor performing their tasks instead. In this way, the configuration can be further simplified, and the costs are saved.

Unless otherwise indicated, the numerical ranges involved include the beginning and end values. It will be obvious to those skilled in the art that changes and modifications may be made, and therefore, the aim in the appended claims is to cover all such changes and modifications.

What is claimed is:

1. A method, comprising:
   1) providing a fan system comprising at least two brushless DC (BLDC) motors and a plurality of wind wheels, the at least two brushless DC (BLDC) motors being closed-loop speed-control motors and adapting to drive corresponding wind wheels, and disposing the at least two brushless DC (BLDC) motors and the plurality of wind wheels in one air duct;
   2) providing a data processor, and storing a constant air volume control function Q=F (n, C) in the data processor, wherein Q indicates an air volume, n indicates a rotational speed of the at least two BLDC motors, and C indicates an operating parameter of the at least two BLDC motors;
   3) transmitting, by the data processor, identical speed signal commands to the at least two BLDC motors, and allowing the at least two BLDC motors to operate at equal or approximately equal rotational speeds; and
   4) feedbacking, by the at least two BLDC motors, motor operating parameters to the data processor, calculating, by the data processor, a motor speed n for outputting and maintaining a constant air volume, and transmitting, by the data processor, the motor speed to the at least two BLDC motors.

2. The method of claim 1, wherein:
   the data processor is disposed outside the at least two BLDC motors;
   the at least two BLDC motors each comprise a control and drive circuit board and a motor body; The control-and-drive-circuit board comprises a power circuit, a microprocessor, a detection circuit for detecting the motor operating parameters, an inverter circuit, and a rotor position measurement circuit; the power circuit supplies power to circuits;
   the rotor position measurement circuit detects and inputs a rotor position signal to the microprocessor;
   the detection circuit inputs detected parameters to the microprocessor;
   the microprocessor controls the inverter circuit to operate; and
   an output terminal of the inverter circuit is connected to windings of a stator assembly.

3. The method of claim 2, wherein the data processor communicates with the at least two BLDC motors in a wired or wireless mode.

4. The method of claim 3, wherein two BLDC motors are employed.

5. The method of claim 4, wherein a difference between a rotational speed specified by the data processor and a real rotational speed of the BLDC motors is within plus or minus 3 turns.

6. The method of claim 2, wherein the at least two BLDC motors have the same specifications.

7. The method of claim 6, wherein the control-and-drive-circuit board is integrated with the motor body.

8. The method of claim 2, wherein the control-and-drive-circuit board is separated from the motor body.

9. The method of claim 8, wherein control and drive circuit boards of the at least two BLDC motors are integrated with the data processor on one circuit board.

10. The method of claim 9, wherein the microprocessors of the control-and-drive-circuit boards of the BLDC motors are replaced by the data processor.

11. The method of claim 1, wherein the data processor is a digital signal processor (DSP) or a microcontroller unit (MCU).

12. The method of claim 1, wherein the data processor communicates with the at least two BLDC motors in a wired or wireless mode.

13. The method of claim 12, wherein two BLDC motors are employed.

14. The method of claim 13, wherein a difference between a rotational speed specified by the data processor and a real rotational speed of the BLDC motors is within plus or minus 3 turns.

15. The method of claim 1, wherein the motor operating parameters are powers or currents.

16. The method of claim 15, wherein the constant air volume in the data processor is an external input value.

17. The method of claim 15, wherein the motor operating parameters fed back to the data processor are the powers, the powers of the BLDC motors are accumulated by the data processor to yield a total power, and then the total power is input to the constant air volume control function $Q=F(n, P)$ to calculate the motor speed n for outputting and maintaining the constant air volume.

18. The method of claim 15, wherein the motor operating parameters fed back to the data processor are a bus current, the bus currents of the BLDC motors are accumulated by the data processor to yield a total bus current, and then the total bus current is input to the constant air volume control function $Q=F(n, P)$ to calculate the motor speed n for outputting and maintaining the constant air volume.

* * * * *